Patented Dec. 14, 1937

2,102,547

UNITED STATES PATENT OFFICE 2,102,547

ACCELERATOR OF VULCANIZATION

Lorin B. Sebrell, Silver Lake, Ohio, assignor to Wingfoot Corporation, Wilmington, Del., a corporation of Delaware No Drawing. Application October 6, 1933, Serial No. 692,427

20 Claims. (Cl. 18—53)

This invention relates to a process of vulcanizing rubber with the aid of an accelerator formed by reacting, in solution, a soluble salt of a mercaptan and a soluble salt of a dithiocarbamate, the reaction being accomplished in the presence of a salt, preferably soluble, of a bivalent metal. The resulting compounds have been found to accelerate the vulcanization of rubber to a very considerable extent and to impart desirable properties to the vulcanized product.

Mercaptobenzothiazole and zinc dimethyl dithiocarbamate and like mercaptans and dithiocarbamates, respectively, have been known for some time to possess the property of accelerating the vulcanization of rubber. As will be more fully pointed out hereinafter, it has now been found that bivalent metallic salts containing both a dithiocarbamyl group and a mercaptan group likewise possess marked accelerating properties. Like the mercaptans and dithiocarbamates, they bring about vulcanization within a short period of time at relatively low temperatures. Rubber vulcanized in their presence is particularly resistant to abrasion and possesses unusual ability to withstand ageing.

As a rule, the accelerators of this invention may be prepared by simply mixing solutions of the dithiocarbamate and of the mercaptan and precipitating the desired compound from this mixed solution by means of a soluble bivalent metal salt. It is necessary only to filter and dry the precipitate. The product thus obtained generally is a fine powder which may be light or dark colored, according to the metal salt employed. The product as such is a very desirable accelerator although it may contain small quantities of the insoluble metal dithiocarbamate and the metal salt of the mercaptan. Since these two materials are likewise good accelerators, it is generally not necessary to free the product of them.

Although it is not possible to state with certainty, it is believed that the accelerators of this invention may be described by the formula

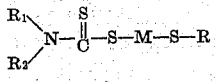

wherein $R_1$ and $R_2$ represent like or unlike hydrocarbon groups or together form a ring configuration. In some cases, one may be hydrogen and the other a hydrocarbon group. R is an organic group and may be an aliphatic or aromatic hydrocarbon or a heterocyclic ring, either unsubstituted or substituted in the manner of the benzenoid thiazoles. Where the mercaptan is simply cyclic rather than heterocyclic, it is preferable that the mercaptan group be directly connected to a nuclear carbon atom of the ring structure; similarly, where the mercaptan is heterocyclic the mercaptan group should preferably be connected to a carbon atom of the heterocyclic ring. M represents any bivalent metal, preferably lead or zinc, obtainable in the form of a soluble salt.

The new accelerators and the reaction which produces them will be illustrated hereafter by reference to specific compounds, but it is to be understood that the invention is not limited to the compounds used as examples.

To illustrate one method of preparation, zinc phenyl dithiocarbamyl benzothiazyl mercaptide, having the formula

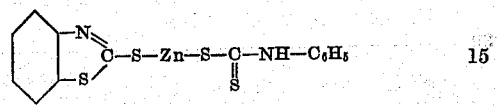

may be prepared by mixing an aqueous solution of 1 mol. of the sodium salt of phenyl dithiocarbamic acid with an aqueous solution of 1 mol. of sodium benzothiazyl mercaptide. To this mixture, sufficient zinc acetate solution to complete precipitation is added. The precipitate is thereupon filtered and dried and is obtained in a high yield. Similar methods may be employed in the manufacture of analogous compounds, examples being zinc cyclo hexyl dithiocarbamyl benzothiazyl mercaptide, lead diethyl dithiocarbamyl benzothiazyl mercaptide, lead penta methylene dithiocarbamyl phenyl mercaptide, zinc dibutyl dithiocarbamyl ethyl mercaptide, etc.

Any other salt of a dithiocarbamate may be employed in the practice of the invention, further examples being dimethyl dithiocarbamate, dicyclohexyl dithiocarbamate, methyl cyclohexyl dithiocarbamate, dipropyl dithiocarbamate, diphenyl dithiocarbamate, dibutyl ethylene dithiocarbamate, ethyl phenyl dithiocarbamate, dibenzyl dithiocarbamate, dimethyl ethylene dithiocarbamate, dibutyl propylene dithiocarbamate, dipropyl dithiocarbamate and the like. Any bivalent metallic salt soluble to a greater or less extent in the particular solvent used may be employed, examples being lead acetate, calcium chloride, cadmium chloride, barium bromide, mercuric nitrate, lead nitrate, zinc chloride, zinc nitrate, etc.

Examples of mercaptans the use of which falls within the scope of this invention are the thio phenols, such as thiophenol, thio cresol, thio xylenol, amino thio phenol, thio naphthol, amino thio naphthol and chlor thio naphthol; the aliphatic mercaptans, such as ethyl mercaptan, propyl mercaptan, butyl mercaptan and the like. Others are the mercaptothiazoles, such as 1-mercaptothiazole, butyl mercaptothiazole, 1-mercapto 3-phenyl thiazole, 1-mercapto benzothiazole, 1-mercapto 4-chlor 5-nitro benzothiazole, 5-nitro mercaptobenzothiazole, 5-amino mercaptobenzothiazole, 4-chlor mercaptobenzothiazole, 5-chlor 1-mercaptobenzothiazole, 1-mercapto naphthothiazoles, 5 - methyl mercaptobenzothiazole, 1-mercapto 3-phenyl benzothiazole, 1-mercapto 3-methoxy benzothiazole, mercapto tolyl thiazoles, and other ring substituted nitro-, amino-, halogen-, alkyl-, oxy-, and aryl-mercapto arylene thiazoles. Still others are the mercapto oxazoles such as mercaptobenzoxazole and mercaptonaphthoxazole, and the mercaptothiazines.

To vulcanize rubber according to the process of this invention, any one of the new accelerators or a mixture thereof is added to any of the ordinary rubber mixes. It has been found that the accelerators of the present invention are effective in rubber compositions of the following formula:

|  | Parts |
|---|---|
| Rubber | 100 |
| Zinc oxide | 5 |
| Sulphur | 3 |
| Stearic acid | 1.5 |
| Accelerator | 1 |

Samples of the material prepared in accordance with the preceding formula, various accelerators being employed, were vulcanized for varying periods of time after which the vulcanized samples were subjected to physical tests in order to determine the tensile strength and elasticity.

The results are as follows:

Zinc cyclohexyl dithiocarbamyl benzothiazyl mercaptide

| Cure-time in mins. | Temp. °F. | Ult. tens. kgs/cm² | Max. elong. in percent | Stress kgs/cm² at 500% | Stress kgs/cm² at 700% |
|---|---|---|---|---|---|
| 20 | 260 | 140 | 925 | 17 | 66 |
| 40 | 260 | 165 | 770 | 26 | 109 |
| 80 | 260 | 158 | 745 | 29 | 119 |
| 60 | 285 | 110 | 725 | 24 | 90 |

Zinc diethyl dithiocarbamyl benzothiazyl mercaptide

| 20 | 260 | 223 | 680 | 41 | 100 |
|---|---|---|---|---|---|
| 40 | 260 | 219 | 710 | 49 | 180 |
| 80 | 260 | 219 | 730 | 62 | 209 |
| 60 | 285 | 192 | 770 | 29 | 126 |

Zinc phenyl dithiocarbamyl benzothiazyl mercaptide

| 20 | 260 | 64 | 880 | 9 | 24 |
|---|---|---|---|---|---|
| 40 | 260 | 98 | 840 | 13 | 42 |
| 80 | 260 | 131 | 820 | 17 | 63 |
| 60 | 285 | 124 | 780 | 23 | 76 |

Lead diethyl dithiocarbamyl benzothiazyl mercaptide

| 20 | 260 | 172 | 710 | 39 | 83 |
|---|---|---|---|---|---|
| 40 | 260 | 134 | 670 | 39 | 83 |
| 80 | 260 | 142 | 715 | 33 | 128 |
| 60 | 285 | 134 | 805 | 22 | 68 |

Lead cyclohexyl dithiocarbamyl benzothiazyl mercaptide

| 20 | 260 | 50 | 895 | 8 | 18 |
|---|---|---|---|---|---|
| 40 | 260 | 108 | 865 | 14 | 42 |
| 80 | 260 | 138 | 825 | 19 | 84 |
| 60 | 285 | 148 | 855 | 19 | 57 |

It will be observed that by the employment as accelerators of the mixed metallic salts of this invention, excellent cures may be obtained at relatively low temperatures and in a comparatively short time. It will be noted that the stocks vulcanized by means of these new accelerators possess relatively high tensile strength and elasticity. In addition to their resistance to ageing is unusually good.

Although specific compounds and reaction products have been employed to illustrate the invention, it is to be understood that the invention is not limited thereto. As has been indicated, bivalent metal salts of many other mercaptans and many other dithiocarbamates may be employed with great success. It is intended that the patent shall cover, by suitable expression in the appended claims, whatever features of patentable novelty reside in the invention.

What I claim is:

1. A new compound prepared by reacting a soluble salt of a mercapto arylene thiazole of the benzene series with a soluble salt of a dithiocarbamate in the presence of a soluble salt of a bivalent metal.

2. A reaction product obtained by the combination of a soluble salt of mercaptobenzothiazole with a soluble salt of a dithiocarbamate in the presence of a soluble salt of a bivalent metal.

3. As a new chemical compound, the material obtained by reacting the sodium salt of mercaptobenzothiazole with the sodium salt of cyclohexyl dithiocarbamate in the presence of a soluble zinc salt.

4. As a new chemical compound, the material obtained by reacting the sodium salt of mercaptobenzothiazole with the sodium salt of cyclohexyl dithiocarbamate in the presence of a soluble lead salt.

5. A method of treating rubber which comprises subjecting it to vulcanization in the presence of a material having the formula $$R\underset{S}{\overset{N}{\diagup\!\!\!\diagdown}}C-SM-S-\underset{\underset{R_2}{|}}{\overset{\overset{S}{\|}}{C}}-N-R_1$$

in which R is an arylene group of the benzene series, $R_1$ and $R_2$ are hydrocarbon groups and M is a metal.

6. A method of treating rubber which comprises subjecting it to vulcanization in the presence of a material obtained by reacting a soluble salt of a mercaptoarylene thiazole of the benzene series with a soluble salt of dithiocarbamate in the presence of a soluble salt of a bivalent metal.

7. A method of treating rubber which comprises subjecting it to vulcanization in the presence of a material obtained by reacting a soluble salt of mercaptobenzothiazole with a soluble salt of a cyclohexyl dithiocarbamate in the presence of a soluble salt of a bivalent metal.

8. A method of treating rubber which comprises subjecting it to vulcanization in the presence of a material obtained by admixing soluble salts of mercaptobenzothiazole and cyclohexyl dithiocarbamate in the presence of a soluble zinc salt.

9. A method of treating rubber which comprises subjecting it to vulcanization in the presence of a material obtained by admixing soluble salts of mercaptobenzothiazole and cyclohexyl dithiocarbamate in the presence of a soluble lead salt.

10. A rubber product which has been vulcanized in the presence of a material having the formula $$R\underset{S}{\overset{N}{\diagup\!\!\!\diagdown}}C-SM-S-\underset{\underset{R_2}{|}}{\overset{\overset{S}{\|}}{C}}-N-R_1$$

in which R is an aryl group of the benzene series, $R_1$ is a hydrocarbon radical and $R_2$ is a radical selected from a group comprising hydrogen and the hydrocarbons.

11. A rubber product that has been vulcanized in the presence of a material obtained by reacting soluble salts of mercaptoarylene thiazoles of the benzene series, dithiocarbamates and bivalent metals.

12. A rubber product obtained by vulcanizing rubber in the presence of a material obtained by admixing solutions of an alkali metal salt of mercaptobenzothiazole with an alkali salt of a dithiocarbamate and a soluble salt of a bivalent metal.

13. A rubber product that has been vulcanized in the presence of a material obtained by the reaction of solutions of alkali metal salts of mercaptobenzothiazole and cyclohexyl dithiocarbamate in the presence of a soluble zinc salt.

14. A rubber product that has been vulcanized in the presence of a material obtained by the reaction of solutions of alkali metal salts of mercaptobenzothiazole and cyclohexyl dithiocarbamate in the presence of a soluble lead salt.

15. The compounds having the formula

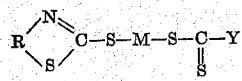

wherein R is an arylene group of the benzene series, M is a bivalent metal and Y is an organic amino radical.

16. The compounds having the formula

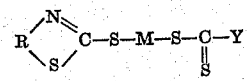

wherein R is an arylene group of the benzene and naphthalene series, M is a bivalent metal and Y is a tertiary amino radical.

17. A zinc dithiocarbamyl benzothiazyl mercaptide.

18. A bivalent metallic salt containing a dithiocarbamic acid group and a benzothiazyl 1-thio group.

19. The new compounds prepared by reacting a soluble salt of mercaptobenzothiazole with a soluble salt of a dithiocarbamate in the presence of a soluble salt of a bivalent metal selected from the group consisting of zinc and lead.

20. A method of treating rubber which comprises incorporating in a vulcanizable rubber mix an accelerator obtained by reacting a soluble salt of mercaptobenzothiazole with a soluble salt of a dithiocarbamate in the presence of a soluble salt of a bivalent metal selected from the group consisting of zinc and lead.

LORIN B. SEBRELL.